US012726532B2

(12) United States Patent
Chen

(10) Patent No.: US 12,726,532 B2
(45) Date of Patent: Sep. 1, 2026

(54) METHODS AND SYSTEM FOR PROGRESSIVE STREAMING OF VIDEO SEGMENTS

(71) Applicant: Adeia Guides Inc., San Jose, CA (US)

(72) Inventor: Tao Chen, Palo Alto, CA (US)

(73) Assignee: ADEIA GUIDES INC., San Jose, CA (US)

( * ) Notice: Subject to any disclaimer, the term of this patent is extended or adjusted under 35 U.S.C. 154(b) by 59 days.

(21) Appl. No.: 18/660,747

(22) Filed: May 10, 2024

(65) Prior Publication Data

US 2025/0350652 A1 Nov. 13, 2025

(51) Int. Cl.
*H04L 65/60* (2022.01)
*H04L 65/80* (2022.01)

(52) U.S. Cl.
CPC .............. *H04L 65/60* (2013.01); *H04L 65/80* (2013.01)

(58) Field of Classification Search
CPC ..... H04L 65/80; H04L 67/131; H04L 47/365; H04L 65/70; H04L 67/303; H04L 65/762; H04L 47/24; H04L 65/1069; H04L 65/1096; H04L 65/611; H04L 65/612; H04L 65/752; H04L 65/764; H04L 69/04; H04L 69/329; H04L 47/32; H04L 47/801; H04L 47/805; H04L 65/403; H04L 1/1854; H04L 47/19; H04L 47/29; H04L 1/0014; H04L 41/0813; H04L 41/5067; H04L 43/0817; H04L 47/50; H04L 67/34; H04L 69/22; H04L 69/324; H04L 1/0001; H04L 1/0003; H04L 1/0009; H04L 1/1614; H04L 1/1896; H04L 41/5025; H04L 43/0876;

(Continued)

(56) References Cited

U.S. PATENT DOCUMENTS

2002/0031114 A1* 3/2002 Terry ..................... H04M 11/06 370/352
2003/0195977 A1* 10/2003 Liu ........................ H04N 19/34 375/E7.181

(Continued)

OTHER PUBLICATIONS

Sadov, V. "A System for Adaptive MPEG Video Streaming Over the Internet Using Prioity Based Technique" Ohio State University, 2000 (Year: 2000).*

(Continued)

*Primary Examiner* — David R Lazaro
(74) *Attorney, Agent, or Firm* — HG LAW LLP

(57) ABSTRACT

Video data transmission with prioritized frame sequences is disclosed for faster processing and play of a segment of a content item. High and low priority video frame transmission sequences are determined. Depending on an indication of the time remaining until play of the video segment, when sufficient time remains for reception of only the high priority frames, for example, I-frames and perhaps some P-frames, then only those are transmitted. These may be played at a lower frame rate before continuing with a subsequent video segment. In response to determining that, before start of play of the segment, sufficient time remains for reception of additional frames, for example, some B-frames, the lower priority frames may be transmitted. In this case, the segment may be played at a higher frame rate. Throughput may be determined according to an adaptive bitrate (ABR) implementation.

20 Claims, 8 Drawing Sheets

(58) Field of Classification Search

CPC . H04L 43/0888; H04L 47/20; H04L 47/2441; H04L 47/323; H04L 47/568; H04L 47/623; H04L 5/0053; H04L 5/0055; H04L 5/0094; H04L 65/1104; H04L 65/4025; H04L 65/61; H04L 67/142; H04L 69/16; H04L 69/166; H04L 69/168; H04L 69/321; H04L 1/0018; H04L 1/1621; H04L 1/1861; H04L 12/417; H04L 12/56; H04L 12/6418; H04L 2012/6454; H04L 2012/6464; H04L 2012/6489; H04L 41/0806; H04L 41/0896; H04L 41/40; H04L 41/509; H04L 43/0882; H04L 43/16; H04L 43/20; H04L 47/2475; H04L 47/521; H04L 47/522; H04L 47/54; H04L 47/6215; H04L 47/626; H04L 63/08; H04L 65/613; H04L 65/65; H04L 65/75; H04L 67/01; H04L 67/104; H04L 67/12; H04L 67/141; H04L 67/146; H04L 67/52; H04L 67/562; H04L 69/32; H04L 9/40; H04L 65/60; H04N 19/164

See application file for complete search history.

(56) References Cited

U.S. PATENT DOCUMENTS

2005/0155072 A1* 7/2005 Kaczowka ......... H04N 21/4147 348/E7.071
2006/0095472 A1* 5/2006 Krikorian ............ H04N 19/117 375/E7.193
2006/0164987 A1* 7/2006 Ruiz Floriach ....... H04W 28/06 370/235
2007/0296854 A1* 12/2007 Berkey .......... H04N 21/234381 375/E7.181
2008/0104659 A1* 5/2008 West .................. H04N 21/2662 725/148
2008/0256272 A1* 10/2008 Kampmann ............ H04L 47/30 710/52
2010/0104009 A1* 4/2010 Hardacker ........... H04N 19/156 375/E7.243
2010/0158109 A1* 6/2010 Dahlby ............. H04N 21/8543 375/240.03
2011/0252155 A1* 10/2011 Parekh ............ H04N 21/23406 709/236
2014/0146676 A1* 5/2014 Howes ................ H04L 47/2441 370/235
2015/0138994 A1* 5/2015 Dadheech ........... H04L 41/5025 370/249
2016/0234536 A1* 8/2016 Stockhammer ......... H04L 65/70
2016/0360220 A1* 12/2016 Song .................... H04N 19/132
2017/0041238 A1* 2/2017 Do ........................ H04L 65/613
2019/0089760 A1* 3/2019 Zhang ..................... H04L 65/70
2022/0321930 A1* 10/2022 Panje ............. H04N 21/234381
2024/0015586 A1* 1/2024 Leung ................... H04L 1/0014
2025/0133440 A1* 4/2025 Fu ..................... H04W 28/0268
2025/0274501 A1* 8/2025 Chin ....................... H04L 65/70
2025/0350652 A1* 11/2025 Chen ....................... H04L 65/60

OTHER PUBLICATIONS

Huo et al. "Network Adapted Selective Frame-Dropping Algorithm for Streaming Media" IEEE 2007 (Year: 2007).*

Brooks et al., "Structural Similarity Quality Metrics in a Coding Context: Exploring the Space of Realistic Distortions," IEEE Transactions on Image Processing, 17(8):1261-1273 (2008).

Feamster et al., "Packet Loss Recovery for Streaming Video," 12th International Packet Video Workshop (11 pages) (2002).

Gurel, et al., "A Fresh Look At Live Sports Streaming With Prioritized Media-Over-Quic Transport," IBC2023, Mar. 18, 2024 (9 pages).

Li et al., "High Efficiency Live Video Streaming With Frame Dropping," IEEE International Conference on Image Processing (ICIP), Abu Dhabi, United Arab Emirates, pp. 1226-1230 (2020).

* cited by examiner

200
Server
204
Control Circuitry
210
Storage
214
Processing Circuitry
216
I/O Path
212
Content Database
206
Communication Network(s)
208
Computing Device
202
Control Circuitry
218
Storage
228
Processing Circuitry
230
I/O Path
220
Speaker
222
Display
224
User Input Interface
226

Display order
30fps
0 1 2 3 4 5 6 7 8 9 10 11 12
I B B Bs B B P B B Bs B B P

Encoded video bitstream
30fps
0 6 3 1 2 4 5 12 9 7 8 10 11
I P Bs B B B B P Bs B B B B High priority bitstream
5fps
0 6 12
I P P
Minimal B-frame stream, nearly zero bits and independently decodable.

Low priority bitstream A
3 9
Bs Bs

Low priority bitstream B
1 4 7 10
B B B B

Low priority bitstream C
2 5 8 11
B B B B

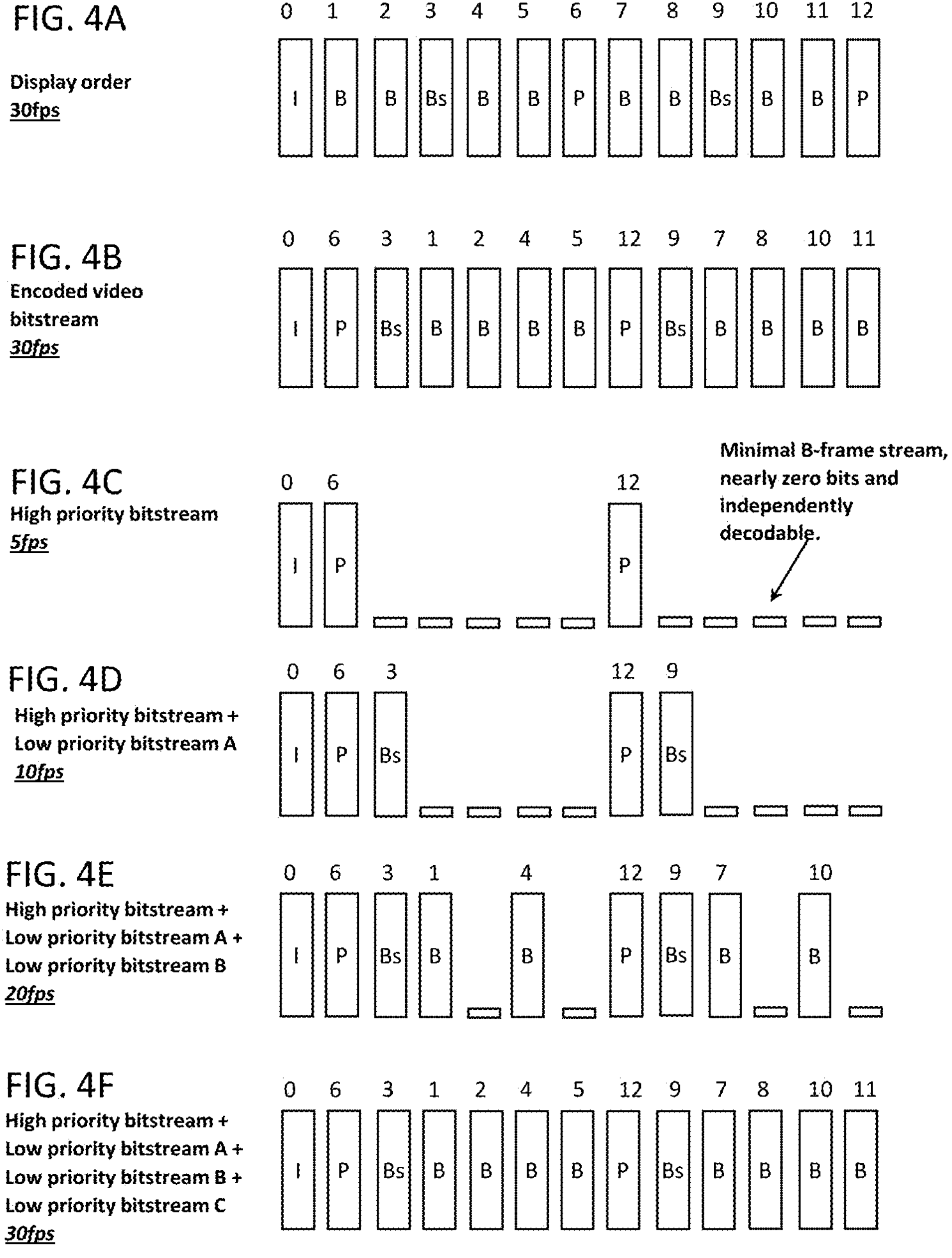
FIG. 4A
Display order
30fps
0 1 2 3 4 5 6 7 8 9 10 11 12
I B B Bs B B P B B Bs B B P
FIG. 4B
Encoded video bitstream
30fps
0 6 3 1 2 4 5 12 9 7 8 10 11
I P Bs B B B B P Bs B B B B
FIG. 4C
High priority bitstream
5fps
0 6 12
I P P
Minimal B-frame stream, nearly zero bits and independently decodable.
FIG. 4D
High priority bitstream +
Low priority bitstream A
10fps
0 6 3 12 9
I P Bs P Bs
FIG. 4E
High priority bitstream +
Low priority bitstream A +
Low priority bitstream B
20fps
0 6 3 1 4 12 9 7 10
I P Bs B B P Bs B B
FIG. 4F
High priority bitstream +
Low priority bitstream A +
Low priority bitstream B +
Low priority bitstream C
30fps
0 6 3 1 2 4 5 12 9 7 8 10 11
I P Bs B B B B P Bs B B B B

FIG. 7

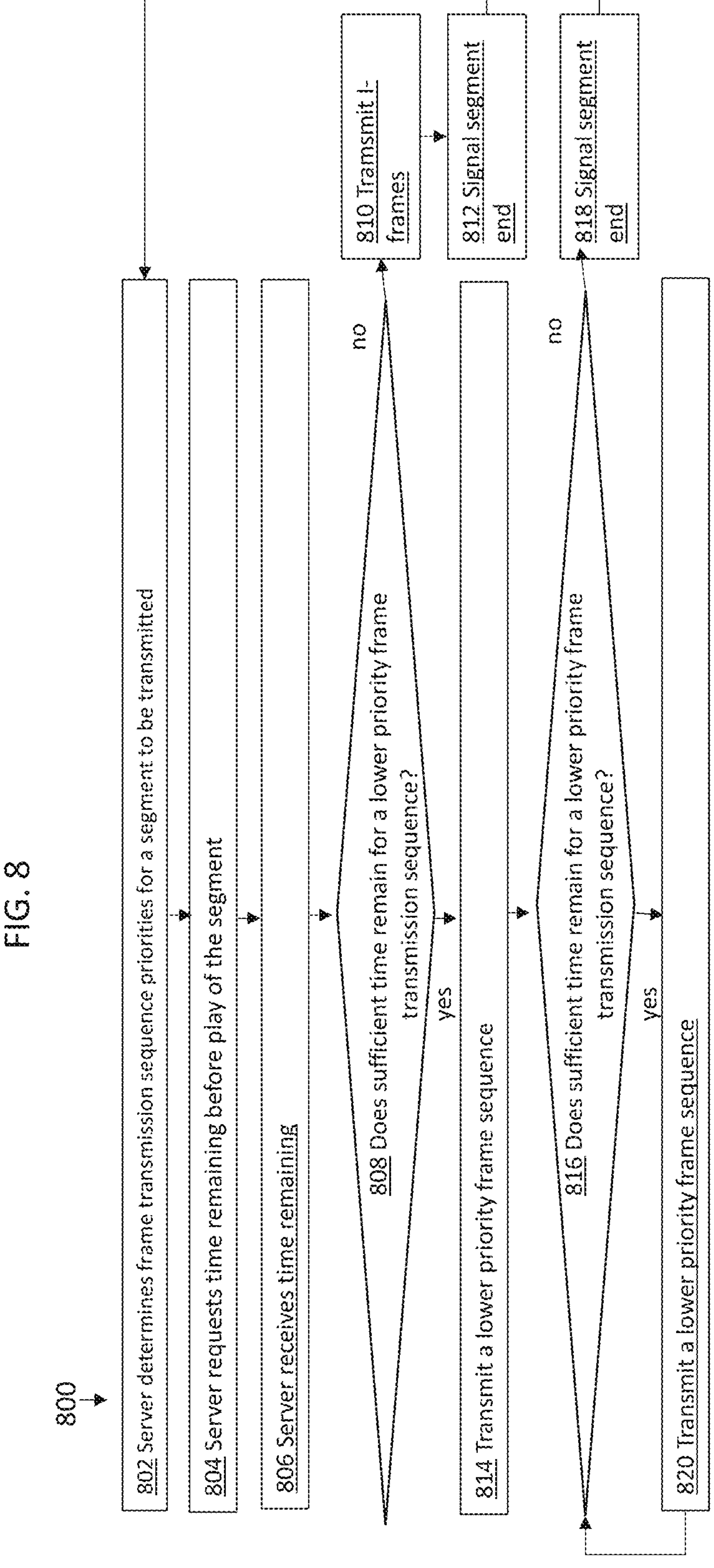

FIG. 8
800
802 Server determines frame transmission sequence priorities for a segment to be transmitted
804 Server requests time remaining before play of the segment
806 Server receives time remaining
808 Does sufficient time remain for a lower priority frame transmission sequence?
no
yes
810 Tramsmit I-frames
812 Signal segment end
814 Transmit a lower priority frame sequence
816 Does sufficient time remain for a lower priority frame transmission sequence?
no
yes
818 Signal segment end
820 Transmit a lower priority frame sequence

METHODS AND SYSTEM FOR PROGRESSIVE STREAMING OF VIDEO SEGMENTS

BACKGROUND

The present disclosure relates to mitigating latency and quality of experience (QoE) issues in streaming media content and, in particular, to prioritizing transmission of higher priority video frames to be played at a lower frame rate.

SUMMARY

Realtime video streaming has become ubiquitous both on desktop and other wired devices and on mobile devices. Due to the high volume of data required for video transmission, latency and dropped frames are often problems.

Bitrate streaming has been widely deployed. Adaptive bitrate (ABR) streaming is responsive to user and network events and can be used in demanding scenarios, e.g., low-latency live streaming. In one approach, ABR streaming is used to control, based on device-specific and network-specific factors, the amount of data transmitted at any given time. ABR streaming is a method of video streaming in which smaller portions, called segments, of a source content are defined, and each segment is encoded at multiple bit rates. The segment length may vary depending on the particular implementation, but they are typically between two and ten seconds. First, the client downloads a manifest file (e.g., shown by way of example as manifest file 600 in FIG. 6) that describes the available stream segments (Segment #) and their respective bitrates (required bandwidth) related to the display of the segment at a given resolution. ABR streaming works by detecting a bandwidth at a client (e.g., user device) and adjusting the bitrate of the media stream accordingly, e.g., in real time. For example, a client application, together with a server, may switch between streaming different quality encodings of a media content item depending on available resources, which can lead to very little buffering, fast start time and a good experience for both high-end and low-end connections. However, while fluctuations of a network bandwidth will lead to automatic upgrade or downgrade of the bitrate and quality in real-time, such time-varying characteristic has an impact on video quality of experience (QoE).

Current adaptive streaming technologies are based on Hypertext Transfer Protocol (HTTP) and are designed to work efficiently over large distributed HTTP networks such as the Internet. Latency and dropped frames may be an issue at slower bit rates. A video player may identify missing frames as errors and resort to error concealment.

Many service providers deploy HTTP Adaptive Streaming (HAS) through Dynamic Adaptive Streaming over HTTP (DASH), or HTTP Live Streaming (HLS). Like other ABR methods, DASH achieves decoder-driven rate adaptation by providing video streams in a variety of bitrates and breaking them into small file segments. The media information of each segment is stored in a manifest file, which is created at a server and transmitted to clients to provide the specification and location of each segment. Throughout the streaming process, the video player at the client and server adaptively switch among the available streams by selecting segments based on playback rate, buffer condition and instantaneous throughput. Typically, ABR algorithms that determine the bitrate of the next segment to download may not be defined within the standard but may be left open for optimization based on, e.g., maximizing audience QoE.

In one approach, frame dropping is used to reduce playback interruptions, including rebuffering and stall. The frames that may be dropped are typically distributed throughout the segment. The distribution of unimportant frames throughout the segment presents the non-trivial challenge of designing a frame-drop tolerant ABR streaming.

A recent approach of Media Over QUIC (MOQ), a transport layer network protocol, prioritizes video frames according to picture types, I, P and B. In video compression, a frame may be encoded using data various techniques, including encoding I-frames (intra-coded picture frames)—an I-frame comprises data for a complete image; P-frames (predicted picture frames)—a P-frame contains data corresponding to the changes in the image from a previous frame to specify content for its current frame; and B-frames (bidirectional predicted picture frames), a B-frame contains data corresponding to the differences between both the preceding frame and a following frame to specify the content for its current frame. In the QUIC approach, I-frames are assigned the highest priority, and B-frames are assigned the lowest in the multiple QUIC streams within one transport. A video stream may thus have different latency and congestion priorities, such that, in a congested network condition, I-frames receive more timely delivery than other frames. A late arrival of frames may be tantamount to frame dropping because the late-arriving frame is too late to be useful in the playback.

According to an embodiment disclosed in the present disclosure, a high priority sequence of frames (e.g., all I-frames and zero, one, or more P-frames), is determined for a segment of a video content item, and one or more lesser priority sequences of frames (e.g., all I-frames, all P-frames and zero, one or more Bs-frames) are determined for the segment of the video content item. A Bs-frame is a type of B-frame whose data is used, as reference, to decode other B-frames. Play of video frame may proceed at a lower frame rate, for example, at 5 frames per second (fps) even when only the high priority frame sequence has been received. For example, the high priority frame sequence that is needed for a first segment of a video item may be buffered in a playback buffer, play may begin, and frames of a second segment may then be buffered and played. Other (lower priority) frames of the first segment may not be transmitted. The display order of the frames may be different from the encoding and/or transmission order(s).

On the other hand, if more time remains until display time of the first segment, then a lower priority frame segment may be transmitted. The lower frame segment would include more frames, and the segment could be played (e.g., after reordering according to the display sequence) at a higher frame rate, for example, 10-30 fps. If the time remaining until display time affords time for even more frames, then a frame sequence with an even lower priority may be transmitted, and the segment could be played at a still higher frame rate, for example, 20-30 fps.

In this way, a process with less latency and frame dropping may be obtained, and quality of experience (QoE) may be improved for the user because of, e.g., less stall, fewer interruptions of the consumption experience, and shorter wait times for buffering, fewer dropped frames, a reduced need for error concealment. Selection of frame sequences to be transmitted may be more granular, prioritizing higher priority frames for each segment of a content item. In an embodiment, the system may decide (e.g., separately for each segment) which frame sequence(s) to transmit, depending on, e.g., the time remaining before the start of decoding and display of the segment, network transmission conditions, and other such factors.

According to an implementation, a single stream or path of data transmission may be used to accommodate existing platforms and services. In an embodiment, multiple streams for various priorities of streaming data may be used. In a progressive streaming implementation, a flexible termination of a segment may be applicable to both non-scalable and scalable streams. Scalable streams come with layered structure, but each layer of bitstream may require a complete buffering for decoding, which may become a problem in varying network conditions. In an implementation, such a bottleneck may be removed where the delivery of a video segment may be more accommodating to bandwidth variability.

Disclosed are an apparatus, system, non-transitory computer-readable medium, method and means for performing the method for addressing latency and quality of experience in data streaming. Such a method may include: determining a high priority transmission sequence of a first set of video data frames of a plurality of video data frames, wherein the plurality of video data frames correspond to a first video segment of a content item; determining a lower priority transmission sequence comprising the first set of video data frames and a second set of video data frames of the plurality of video data frames; receiving an indication of time remaining until play of the first video segment of the content item; determining, based at least in part on the indication of the time remaining until play of the first video segment, whether sufficient time remains for reception of both the first set of video data frames and the second set of video data frames; in response to determining that sufficient time remains for reception of both the first set of video data frames and the second set of video data frames: (i) causing transmission, according to the lower priority transmission sequence, of the first set of video data frames and the second set of video data frames; and (ii) causing play of the first video segment at a first frame rate; and in response to determining that sufficient time does not remain for reception of both the first set of video data frames and the second set of video data frames: (i) causing transmission, according to the high priority transmission sequence, of the first set of video data frames and not causing transmission of the second set of video data frames of the first video segment; and (ii) causing play of the first video segment at a second frame rate lower than the first frame rate.

A bitrate for transmission may be determined according to an adaptive bitrate (ABR) transmission protocol, such that the causing the transmission according to the lower transmission sequence and according to the high priority transmission sequence may be performed according to the determined bitrate and according to the indication of the time remaining until play of the first video segment.

In such a method the first set of video data frames may include I-frames only, or may include I-frames and some P-frames. By way of further example, the first set of video data frames may include I-frames and may be free of B-frames. The second set of video data frames may include B-frames, or the second set of video data frames may include only Bs-frames, but no B-frames other than Bs-frames.

In addition, the method may include: determining a third transmission sequence comprising the first set of video data frames, the second set of video data frames, and a third set of video data frames of the plurality of video data frames, wherein the third set of video data frames comprises B-frames and is free of I-frames; and in response to determining, according to the indication of the time remaining until play of the first video segment, that sufficient time remains for reception of the first set of video data frames, the second set of video data frames and the third set of video data frames: (i) causing transmission, according to the third transmission sequence, of the first set of video data frames, the second set of video data frames and the third set of video data frames; and (ii) causing play of the first video segment at a higher frame rate than the first frame rate. It is to be understood that more than three, or fewer than three, transmission sequences may be provided. For example, there may be three, four, five or more sets of video frames of varying priorities, and the transmission sequence may be selected based on the time remaining until the segment is played. The frame rate for playing the sequence may then be selected according to the number of frames available for the segment.

While described herein by way of example as video frames, it will be understood that other types of data blocks may also be prioritized and their transmission sequences chosen according to their priorities and how much time remains until play. For example, audio data blocks may be so provided alone or to accompany respective video frames. Some embodiments may include one or more various multimedia streams.

When it is determined, according to the indication of the time remaining until play of the first video segment, that no sufficient time remains for reception of both the first set of video data frames and the second set of video data frames, video frames may be displayed according to a display order such that video frames of the first set of video data frames are repeated in place of the video frames of the second set of video data frames.

In response to the determining that sufficient time does not remain for reception of both the first set of video data frames and the second set of video data frames: an indication of a segment-end may be transmitted following the transmission of the first set of video data frames. For example, this may signal the end of the first video segment and thus a second segment may be decoded and played without waiting for additional frames of the segment. Also, at this time a video data frame of a second video segment of the content item subsequent to the first video segment of the content item may be transmitted.

In an embodiment, the time remaining before playback/play of the next video segment needed for video play by the client media device could be monitored continually by the client media play device. Then, the client media play device may report to the server how much time remains before the segment is needed for play in the course of the play of a video, so that in case insufficient time remains before play, only high priority frames may be transmitted to the client media play device. Or the client media play device may monitor the time remaining before play of a segment and only in case insufficient time remains before play of the segment report to the server the time remaining, or request from the server that only high priority frames be transmitted.

In an embodiment, in response to one or more conditions, a "special play mode" may be invoked. For example, in response to the client media player experiencing one or more of a bad quality of experience, one or more dropped frames, several rebuffering events, low bitrate transmission by the server, a disruption in internet connection, or the like, a special play mode may be entered, in which the time that remains before the next needed segment is to be played is continually monitored and reported by the client media player to the media server. Also, in response to entering the special play mode, the server may continually request from the client media device and/or may continually monitor receipt of data indicating whether sufficient time remains before play of the next needed segment. Based on this received information, the server may adjust the transmission of frames according to their priority levels, as described herein. Then, when the underlying condition no longer exists, for example, when normal network transmission speeds resume, then the special play mode may be exited.

Other aspects and features of the present disclosure will become apparent to those ordinarily skilled in the art upon review of the following description of specific embodiments in conjunction with the accompanying figures.

BRIEF DESCRIPTION OF THE DRAWINGS

The present disclosure, in accordance with one or more various embodiments, is described in detail with reference to the following Figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale. The above and other objects and advantages of the disclosure will be apparent upon consideration of the following detailed description, taken in conjunction with the accompanying drawings, in which like reference characters refer to like parts throughout, and in which:

FIG. 4A illustrates the video frame display sequence comprising various types of video frame data according to a video compression standard;

FIG. 4B illustrates the video frames in an encoding sequence according to a video compression standard;

FIG. 4C illustrates the video frame transmission sequences comprising high priority video frames, according to some examples of the disclosure;

FIGS. 4D-4F illustrate video frame transmission sequences comprising the transmission sequences that include the high priority video frames and additional video frames of lower priority, according to some examples of the disclosure;

FIG. 7 is a flowchart that shows an example of a process for carrying out a method, in accordance with some examples of the disclosure;

FIG. 8 is a flowchart that shows an example of another process for carrying out a method, in accordance with some examples of the disclosure.

DETAILED DESCRIPTION

Figure 1:
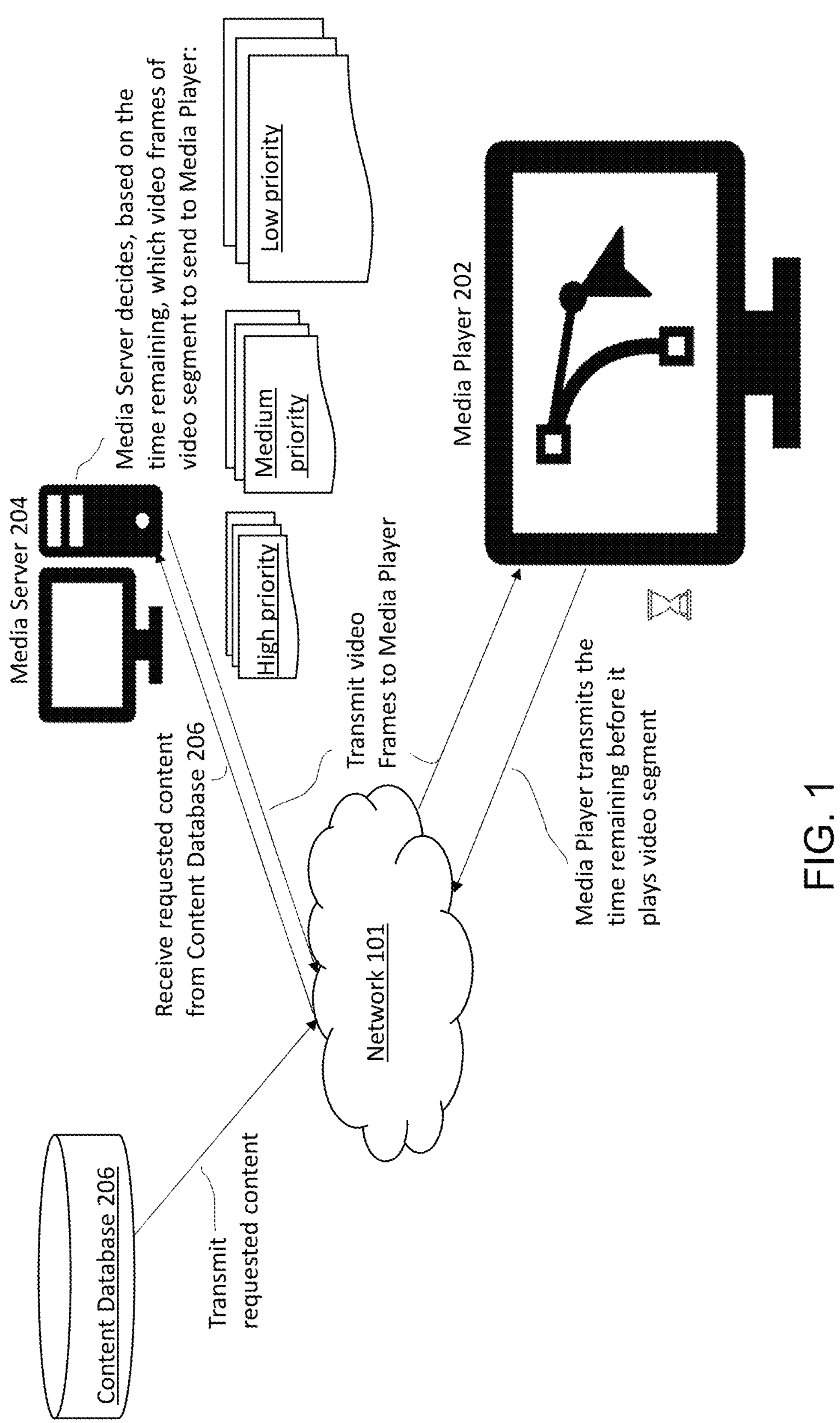
FIG. 1 illustrates a server deciding which series of video frames of a segment of a media content item to transmit to a client media player based on time remaining before playing of the segment next needed for play, according to some examples of the disclosure.

FIG. 1 illustrates a media server 204 deciding which series of video frames of a segment of a media content item to transmit over a network 101 to a client media player 202 according to time remaining before the segment is to be played by the media player 202, according to some examples of the disclosure. Video data may be encoded according to a variety of coding formats, sometimes referred to as video compression formats or content representation formats. The video data may be part of a media content item, such as a broadcast or other streaming movie, show, sportscast, or other type of streaming session, and may include video, audio, and other elements, including metadata.

Figure 2:
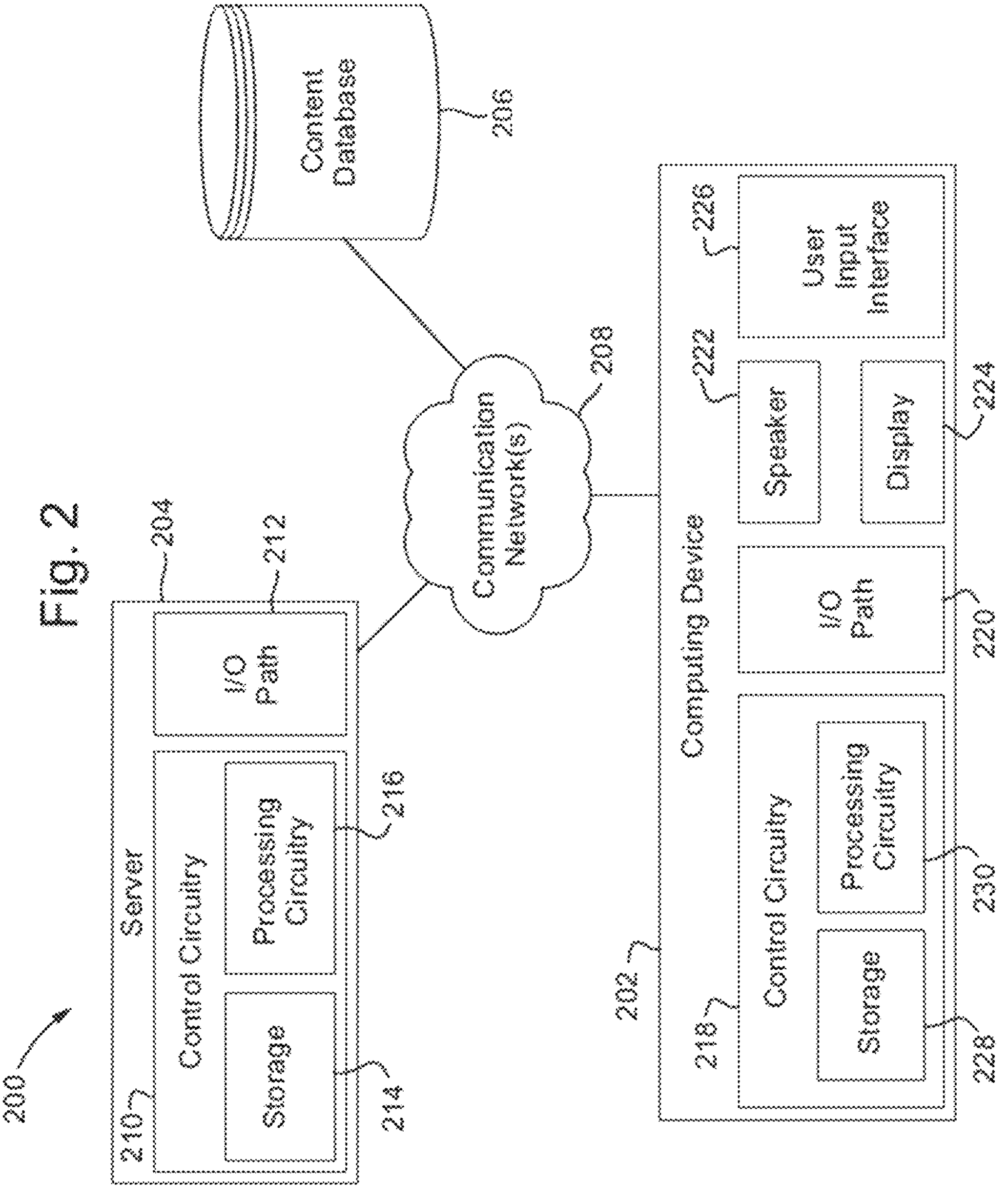
FIG. 2 illustrates an example of a server communicating over a network with a device, in accordance with some examples of the disclosure.

FIG. 2 is an illustrative block diagram showing exemplary system 200 configured to display media content. Although FIG. 2 shows system 200 as including a number and configuration of individual components, in some examples, any number of the components of system 200 may be combined and/or integrated as one device, e.g., as user device 102. System 200 includes computing device 202 (e.g., user device 102), server 204 (e.g., server 104), and content database 206 (e.g., content database 106), each of which is communicatively coupled to communication network 208 (e.g., network 108), which may be the Internet or any other suitable network or group of networks. In some examples, system 200 excludes server 204, and functionality that would otherwise be implemented by server 204 is instead implemented by other components of system 200, such as computing device 202. In still other examples, server 204 works in conjunction with computing device 202 to implement certain functionality described herein in a distributed or cooperative manner.

Server 204 includes control circuitry 210 and input/output (hereinafter "I/O") path 212, and control circuitry 210 includes storage 214 and processing circuitry 216. Computing device 202, which may be a personal computer, a laptop computer, a tablet computer, a smartphone, a smart television, a smart speaker, tablet, mobile phone, video media player, or any other type of computing device, includes control circuitry 218, I/O path 220, speaker 222, display 224, and user input interface 226, which in some examples provides a user selectable option for enabling and disabling the display of modified subtitles. Control circuitry 218 includes storage 228 and processing circuitry 220. Control circuitry 210 and/or 218 may be based on any suitable processing circuitry such as processing circuitry 216 and/or 220. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 214, storage 228, and/or storages of other components of system 200 (e.g., storages of content database 206, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 2D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 214, storage 228, and/or storages of other components of system 200 may be used to store various types of content, metadata, and or other types of data. Non-volatile memory may also be used (e.g., to launch a boot-up routine and other instructions). Cloud-based storage may be used to supplement storages 214, 228 or instead of storages 214, 228. In some examples, control circuitry 210 and/or 218 executes instructions for an application stored in memory (e.g., storage 214 and/or 228). Specifically, control circuitry 214 and/or 228 may be instructed by the application to perform the functions discussed herein. In some implementations, any action performed by control circuitry 214 and/or 228 may be based on instructions received from the application. For example, the application may be implemented as software or a set of executable instructions that may be stored in storage 214 and/or 228 and executed by control circuitry 214 and/or 228. In some examples, the application may be a client/server application where only a client application resides on computing device 202, and a server application resides on server 204.

The application may be implemented using any suitable architecture. For example, it may be a stand-alone application wholly implemented on computing device 202. In such an approach, instructions for the application are stored locally (e.g., in storage 228), and data for use by the application is downloaded on a periodic basis (e.g., from an out-of-band feed, from an Internet resource, or using another suitable approach). Control circuitry 218 may retrieve instructions for the application from storage 228 and process the instructions to perform the functionality described herein. Based on the processed instructions, control circuitry 218 may determine what action to perform when input is received from user input interface 226.

In client/server-based examples, control circuitry 218 may include communication circuitry suitable for communicating with an application server (e.g., server 204) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 208). In another example of a client/server based application, control circuitry 218 runs a web browser that interprets web pages provided by a remote server (e.g., server 204). For example, the remote server may store the instructions for the application in a storage device. The remote server may process the stored instructions using circuitry (e.g., control circuitry 210) and/or generate displays. Computing device 202 may receive the displays generated by the remote server and may display the content of the displays locally via display 224. In this way, the processing of the instructions is performed remotely (e.g., by server 204) while the resulting displays, such as the display windows described elsewhere herein, are provided locally on computing device 202. Computing device 202 may receive inputs from the user via input interface 226 and transmit those inputs to the remote server for processing and generating the corresponding displays.

A user may send instructions, e.g., to view an interactive media content item and/or select one or more programming options of the interactive media content item, to control circuitry 210 and/or 218 using user input interface 226. User input interface 226 may be any suitable user interface, such as a remote control, trackball, keypad, keyboard, touchscreen, touchpad, stylus input, joystick, voice recognition interface, gaming controller, or other user input interfaces. User input interface 226 may be integrated with or combined with display 224, which may be a monitor, a television, a liquid crystal display (LCD), an electronic ink display, or any other equipment suitable for displaying visual images.

Server 204 and computing device 202 may transmit and receive content and data via I/O path 212 and 220, respectively. For instance, I/O path 212 and/or I/O path 220 may include a communication port(s) configured to transmit and/or receive (for instance to and/or from content database 206), via communication network 208, content item identifiers, content metadata, natural language queries, and/or other data. Control circuitry 210, 218 may be used to send and receive commands, requests, and other suitable data using I/O paths 212, 220.

FIGS. 3A-3F illustrate examples of video frame sequences for a video segment of a content item, such as a video or other media content item.

Figures 3A, 3B, 3C, 3D, 3E, 3F:
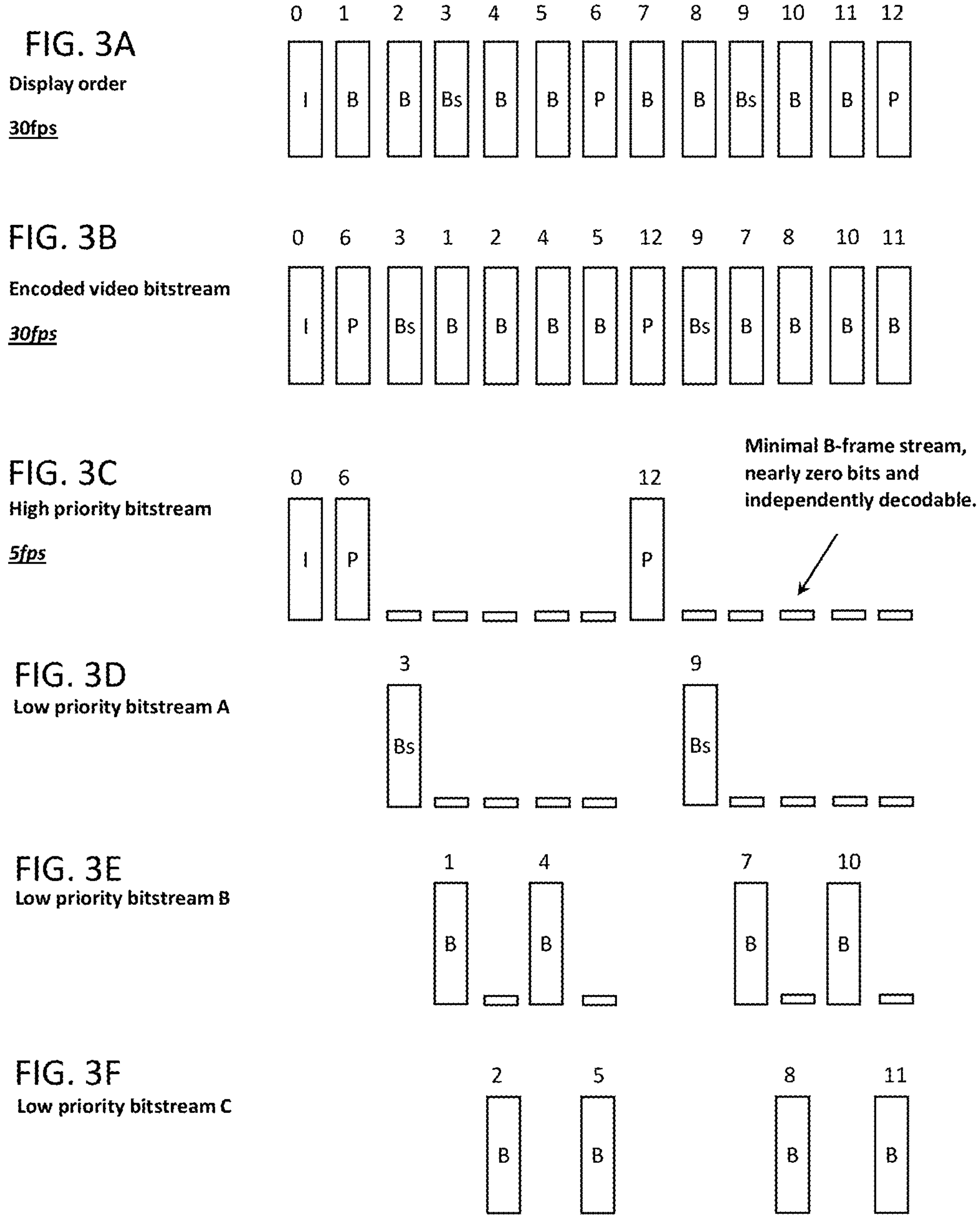
FIG. 3A illustrates a video frame display sequence comprising various types of video frame data according to a video compression protocol.
FIG. 3B illustrates the video frames in an encoding sequence according to a video compression protocol.
FIG. 3C illustrates a video frame transmission sequences comprising high priority video frames, according to some examples of the disclosure.
FIGS. 3D-3F illustrate video frame transmission sequences comprising additional video frame transmission sequences of lower priority, according to some examples of the disclosure.

In the example shown in FIG. 3A, video frames 0-12 are in a display order, and may be displayed at a 30 frames per second (fps), or at other frame rates, in a standard mode by a media player, such as computing device 202 (shown in FIG. 2). The video frames 0-12 of FIG. 3A may comprise an entire segment of a video content item, or may comprise a part of a segment. The frames may be encoded using data compression techniques, including I-frames (intra-coded picture frames), P-frames (predicted picture frames, and B-frames (bidirectional predicted picture frames). A Bs-frame is a type of B-frame that is used as a reference frame for the inter-prediction in encoding other B-frames.

Frames are often transmitted in a transmission sequence different from the display sequence and then after they are decoded the frames may be re-ordered to the display sequence. FIG. 3B shows an example of an encoded frame sequence, which may be transmitted, and then decoded and displayed. FIG. 3B shows all of the same video frames 0-12 re-arranged in the encoding and transmission order, assuming that ample time remains before display time for transmitting, buffering and decoding all the frames of the segment. The segment begins with the first frame, frame 0, which is an I-frame, in both the display order and the encoding order. As shown in FIG. 3B, frame 1 in the display sequence is a B-frame, and has been moved to a later position, to the fourth frame position, in the encoding sequence. The second frame in the encoded sequence is frame 6, a P-frame.

FIG. 3C shows an example of a high priority frame transmission sequence. In the example, shown, only a single I-frame is present for the sequence. In addition, two P-frames, frames 6 and 12, are also included in the example shown. The frame transmission sequence shown in FIG. 3C is different from the frame transmission sequence shown in FIG. 3B in that in the frame transmission sequence shown in FIG. 3C B-frames have been omitted from the transmission. By way of example, some or all B-frames may be omitted. In an embodiment, the order in which the frames are transmitted in the frame transmission sequence shown in FIG. 3B and in the frame transmission sequence shown in FIG. 3C may be identical except that some frames are omitted in the frame transmission sequence shown in FIG. 3C. In an embodiment, one or more P-frames, or all P-frames, may be omitted in the high priority frame transmission sequence. In an embodiment, all the P-frames may be included in the high priority frame transmission sequence. In an embodiment, a minimal B-frame stream indicating the place and sequence of the B-frames omitted from the high priority frame transmission sequence may also be included. An indication of a segment-end may be transmitted following the final frame of the sequence, which may signal the receiving node that it can start decoding the segment saved in a buffer.

After decoding, the frames received according to the frame transmission sequence shown in FIG. 3C may be reordered and played, for example at 3-15 fps, in the display order shown in FIG. 3A (with omitted frames not being provided for display). Play of the segment may thus start sooner because fewer frames need to be transmitted and decoded for the video segment, thus mitigating latency and improving QoE. Each frame may be numbered for decoding, so that the decoding node, that is the computing device 202, would be informed as to the order in which frames are to be decoded irrespective of what frame is transmitted first. Such numbering may be different from the display order numbering shown as 0-12 in FIGS. 0-12.

FIG. 3D illustrates a lower priority frame transmission sequence that includes Bs-frames. By including more frames, the segment may be played at a higher frame rate, for example, 5-30 fps, or 6-15 fps, for improved QoE. In an embodiment, all the Bs-frames, may be included in this frame transmission sequence. In an embodiment, a minimal B-frame stream indicating the place and sequence of the B-frames omitted from this frame transmission sequence may also be included in this frame transmission sequence. An indication of a segment-end may be transmitted following the final frame of the sequence, in this example, shown as Bs-frame 9 to indicate that the segment is ready for decoding/playing.

FIG. 3E illustrates an additional lower priority frame transmission sequence that includes B-frames other than Bs-frames. By including such B-frames, the segment may be played at a higher frame rate, for example, 10-30 fps, or 15-20. In an embodiment, additional B-frames may be included—these additional B-frames determined in advance prior to transmission according to which of the B-frames are more important than other B-frames in conveying a scene or other information. In an embodiment, additional B-frames may be included—these additional B-frames determined according to which of the B-frames entails transmission of less data than other B-frames. In an embodiment, a minimal B-frame stream indicating the place and sequence of the B-frames omitted from the frame transmission sequence shown in FIG. 3E may also be included in this frame transmission sequence. An indication of a segment-end may be transmitted following the final frame of the sequence to indicate that the segment is ready for decoding/playing.

FIG. 3F illustrates additional B-frames as a frame transmission sequence. With these additional frames, this segment may be played at a higher frame rate, for example, 20-30 fps, or 30 fps. In embodiment, additional lower priority frame transmission sequences may be sent, if more time remains before play of this segment, after the frame transmission sequence shown in FIG. 3F. In an embodiment, instead of the four frame transmission sequences shown in FIGS. 3C-3F, the frames may be allocated to frame transmission sequences such that there may be two, three, five or more frame transmission sequences of decreasing priority.

Frames or data blocks other than I-frames, P-frames, Bs-frames and B-frames are also contemplated and may be transmitted according to the importance of their content for other frames or data blocks of a segment. While examples discussed herein are sometimes referred to as video frames, other type of encoded data blocks may also be transmitted according to such a scheme in which: (i) a first sequence of higher priority encoded data blocks, to be played or consumed at a lower rate, are transmitted, or (ii) a second sequence of lower priority encoded data blocks, to be played or consumed at a higher rate, are transmitted, the choice of (i) or (ii) depending on how much time remains before consumption time.

The first frame sequence, the high priority frame transmission sequence shown in FIG. 3C, may be transmitted for a segment and this high priority frame transmission sequence may be stored in a buffer. Then, following this sequence, if sufficient time remains, a second frame sequence as shown in FIG. 3D, for example, in this case the Bs-frames (frames 3 and 9) may be transmitted—the earlier transmitted high priority sequence has already been stored in the buffer. Continuing with this scheme, following the second frame sequence, a third frame sequence may be transmitted, if additional sufficient time remains. This third frame sequence would include a select set of B-frames (in this example, the B-frames 1, 4, 7 and 10 shown in FIG. 3E). Finally for this segment, if still additional time remains, the server may transmit the remaining frames, in this example, the remaining B-frames shown in FIG. 3F.

FIGS. 4A-4F illustrate another examples of video frame sequences for a video segment of a content item, such as a video or other media content item.

In the example shown in FIG. 4A, video frames 0-12 are in a display order, and may be displayed at a 30 frames per second (fps) rate, or at other frame rates, in a standard mode by a media player, such as computing device 202 (shown in FIG. 2). As discussed, with regard to FIG. 3, the video frames 0-12 of FIG. 4A may comprise an entire segment of a video content item, or may comprise a part of a segment.

FIG. 4B shows the example of the encoded frame sequence shown in FIG. 3B, which may be transmitted, and then decoded and displayed. FIG. 4B shows all of the same video frames 0-12 re-arranged in the encoding and transmission order, assuming that ample time remains before display time for transmitting, buffering and decoding all the frames of the segment. The segment begins with the first frame, frame 0, which is an I-frame, in both the display order and the encoding order. In an embodiment, this frame may be an Instantaneous Decoder Refresh (IDR) frame, so that subsequent frames of the segment may be decoded correctly without reference to frames that came before the IDR frame. As shown in FIG. 4B, frame 1 in the display sequence is a B-frame, and has been moved to a later position, to the fourth frame position, in the encoding sequence.

FIG. 4C shows an example of the high priority frame transmission sequence shown in FIG. 3C. In the example, shown, only a single I-frame is present for the sequence. In addition, two P-frames, frames 6 and 12, are also included in the example shown. The frame transmission sequence shown in FIG. 4C is different from the frame transmission sequence shown in FIG. 4B in that in the frame transmission sequence shown in FIG. 4C B-frames have been omitted from this transmission frame sequence. By way of example, some or all P-frames may be omitted. In an embodiment, the order in which the frames are transmitted in the frame transmission sequence shown in FIG. 4B and in the frame transmission sequence shown in FIG. 4C may be identical except that some frames are omitted in the frame transmission sequence shown in FIG. 4C. In an embodiment, one or more P-frames, or all P-frames, may be omitted in the high priority frame transmission sequence. In an embodiment, all the P-frames may be included in the high priority frame transmission sequence. An indication of a segment-end may be transmitted following the final frame of the sequence, which may signal the receiving node to start decoding the segment saved in a buffer. For example, such a segment-end signal may be transmitted if it is determined that insufficient time remains to transmit a lower priority frame sequence before the segment is to be played by the client media device 202.

After decoding, the frames received according to the frame transmission sequence shown in FIG. 4C may be reordered and played, for example at 3-15 fps, in the display order shown in FIG. 4A (with omitted frames not being provided for display). Play of the frames may thus start sooner because fewer frames need to be transmitted and decoded for the video segment, thus mitigating latency and improving QoE.

FIG. 4D illustrates the high priority frame transmission sequence shown in FIG. 4C combined with a lower priority frame transmission sequence that includes Bs-frames. The frame transmission sequence shown in FIG. 4D may be transmitted instead of the frame transmission sequence shown in FIG. 4C if it is determined that sufficient time remains both for the high priority frames shown in FIG. 4C and for the lower priority frames shown in FIG. 3D, By including more frames, the segment may be played at a higher frame rate, for example, 5-30 fps, or 6-15 fps, for improved QoE. In an embodiment, the frame transmission sequence shown in FIG. 4D may be different from the frame transmission sequence shown in FIG. 4C only in that in the frame transmission sequence shown in FIG. 4D one or more B frames have been included. In an embodiment, all the Bs-frames, may be included in this frame transmission sequence. An indication of a segment-end may be transmitted following the final frame of the sequence, in this example, shown as Bs-frame 9 to initiate the process of decoding/playing.

FIG. 4E illustrates the high priority frame transmission sequence shown in FIG. 4C combined with the lower priority frame transmission sequence that includes Bs-frames shown in FIG. 4D plus one or more additional B-frames. The frame transmission sequence shown in FIG. 4E may be transmitted instead of the frame transmission sequences shown in FIGS. 4C and 4D if it is determined that sufficient time remains for the high priority frames shown in FIG. 4C and for the lower priority frames shown in FIGS. 3D and 3E. By including more B-frames, the segment may be played at a higher frame rate, for example, 10-30 fps, or 15-20. In an embodiment, the frame transmission sequence shown in FIG. 4E may be different from the frame transmission sequence shown in FIG. 4D only in that one or more B-frames, in addition to Bs-frames, are included. In an embodiment, additional B-frames may be included—these additional B-frames determined in advance prior to transmission according to which of the B-frames are more important than other B-frames in conveying a scene or other information. In an embodiment, additional B-frames may be included—these additional B-frames determined according to which of the B-frames entails transmission of less data than other B-frames. In an embodiment, a minimal B-frame stream indicating the place and sequence of the B-frames omitted from the frame transmission sequence shown in FIG. 4E may also be included in this frame transmission sequence. An indication of a segment-end may be transmitted following the final frame of the sequence to initiate the process of decoding/playing.

FIG. 4F illustrates the high priority frame transmission sequence shown in FIG. 4C combined with the lowest priority frame transmission sequence that includes Bs-frames shown in FIG. 4D, additional B-frames included in FIG. 4E, plus all other B-frames. In an embodiment, the frame transmission sequence shown in FIG. 4F may be different from the frame transmission sequence shown in FIG. 4E only in that all remaining B-frames are included. This segment thus may be played at a higher frame rate, for example, 20-30 fps, or 30 fps. The frame transmission sequence shown in FIG. 4E may be transmitted instead of the frame transmission sequences shown in FIGS. 4C, 4D and 4E if it is determined that sufficient time remains both for the high priority frames shown in FIG. 4C and for the lower priority frames shown in FIGS. 3D, 3E and 3F.

Figure 5:
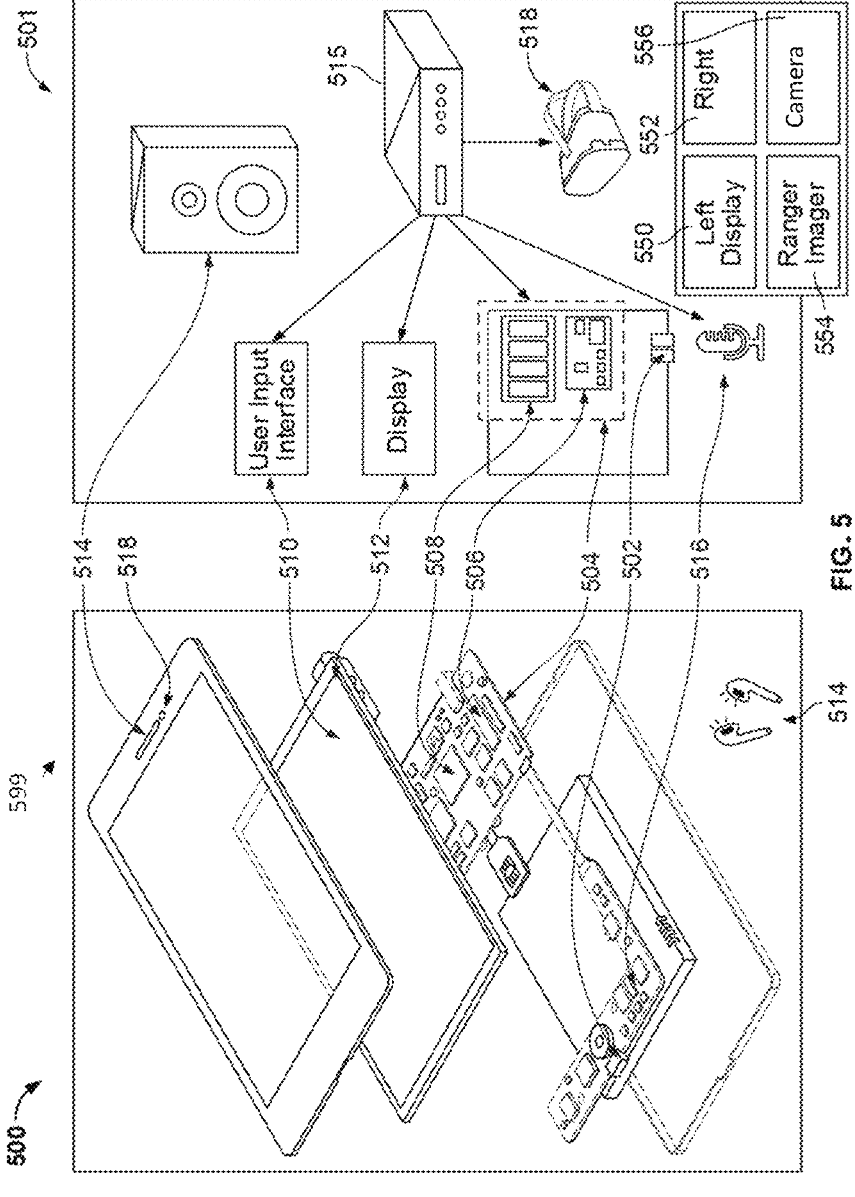
FIG. 5 illustrates an example of a computer system for implementing methods described herein, in accordance with some examples of the disclosure.
Figure 6:
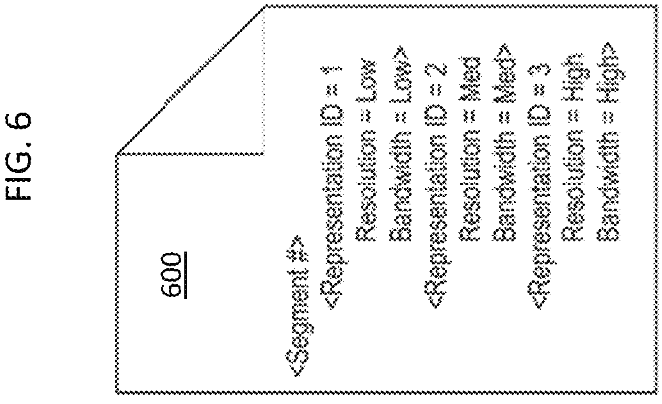
FIG. 6 illustrates a data manifest, in accordance with some examples of the disclosure.

FIG. 5 illustrates an example of an implementation of a computing device 202, 204, including some components thereof. A circuit board may include control circuitry, processing circuitry, and storage (e.g., RAM, ROM, hard disk, removable disk, etc.). In some embodiments, the circuit board may include an input/output path for communicating with the XR HMD controller 916 provided as a remote device. Each device 400/401 may receive content and data via input/output (I/O) path 412 that may comprise I/O circuitry (e.g., network card, or wireless transceiver). I/O path 412 may communicate over a local area network (LAN) or wide area network (WAN), for example, via Wi-Fi, Bluetooth, cellular or other wireless or wired connection.

Control circuitry 418 may comprise processing circuitry 420 and storage 422 and may comprise I/O circuitry. Control circuitry 418 may be used to send and receive commands, requests, and other suitable data using I/O path, which may comprise I/O circuitry. I/O path may connect control circuitry 418 (and specifically processing circuitry) to one or more communications paths (described below). I/O functions may be provided by one or more of these communications paths but are sometimes shown as a single path to avoid overcomplicating the drawing.

Control circuitry 418 may be based on any suitable control circuitry such as processing circuitry 420. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i9 processors) or multiple different processors (e.g., an Intel Core i9 processor and an Intel Core i7 processor). In some embodiments, control circuitry 418 executes instructions for various applications, including the XR application, stored in memory (e.g., storage 422). Specifically, control circuitry 418 may be instructed by the XR application to perform the functions discussed above and below. In some implementations, processing or actions performed by control circuitry may be based on instructions received from the XR application and/or the application for controlling the light source.

In some client/server-based embodiments, control circuitry 418 may include communications circuitry suitable for communicating with other networks. The instructions for performing any of the embodiments discussed herein may be encoded on non-transitory computer-readable media (e.g., a hard drive, random-access memory on a DRAM integrated circuit, read-only memory etc.). For example, the instructions may be stored in storage 418, and executed by control circuitry 418 of a device 418.

Control circuitry 418 may include communications circuitry suitable for communicating with a server, XR equipment controller and devices, a table or database server, or other networks or servers. Such communications may involve the Internet or any other suitable communication networks or paths. In addition, communications circuitry may include circuitry that enables peer-to-peer communication of user equipment devices, or communication of user equipment devices in locations remote from each other (described in more detail below).

Memory may be an electronic storage device provided as storage 422 that is part of control circuitry 418. As referred to herein, the phrase "electronic storage device" or "storage device" should be understood to mean any device for storing electronic data, computer software, or firmware, such as random-access memory, read-only memory, hard drives, optical drives, digital video recorders, solid state devices, quantum storage devices, gaming consoles, or any other suitable fixed or removable storage devices, and/or any combination of the same. Storage 422 may be used to store various types of content described herein. Nonvolatile memory may also be used (e.g., to launch a boot-up routine and other instructions).

Control circuitry 418 may include video generating circuitry and tuning circuitry. Control circuitry 418 may also include scaler circuitry for upconverting and down converting content into the preferred output format of equipment 400. Control circuitry 418 may also include digital-to-analog converter circuitry and analog-to-digital converter circuitry for converting between digital and analog signals. In some embodiments all elements of system 400 may be inside housing of the XR display device 418. In some embodiments, XR HMD display device 418 comprises a camera 456 (or a camera array or LiDAR-Light Detection and Ranging). Video cameras may be integrated with the equipment or externally connected. One or more of cameras may be a digital camera comprising a charge-coupled device (CCD) and/or a complementary metal-oxide semiconductor (CMOS) image sensor. In some embodiments, one or more of cameras 456 may be dirtied at outside physical environment (e.g., two cameras may be pointed out to capture to parallax views of the physical environment). In some embodiments, XR device 101 may comprise one or more biometric sensor or sensors to measure eye rotation (e.g., electrodes to measure eye muscle contractions) and head movement. HMD 418 may also comprise range imager 454 (e.g., LASER or LIDAR) for computing distance of physical objects by bouncing the light of the objects and measuring delay in return (e.g., using cameras 456). In some embodiments, HMD 418 comprises left display 450, right display 450 (or both) for generating VST images.

The server 204 may be implemented using any suitable architecture, and the computing device 202 may be implemented using any suitable architecture. Processes described herein may be implemented as stand-alone applications wholly implemented on each one of device 400 and equipment device 401. In such an approach, instructions of the application may be stored locally (e.g., in storage 408), and data for use by the application is downloaded on a periodic basis (e.g., from the edge service network, from an out-of-band feed, from an Internet resource, or using another suitable approach). Control circuitry 418 may retrieve instructions of the application from storage 408 and process the instructions to provide functionality and perform any of the actions discussed herein. Based on the processed instructions, control circuitry 418 may determine what action to perform when input is received from user input interface 410. For example, head movement or movement of a hand or handheld device via user input interface 410. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, applications and processes described herein may be downloaded and interpreted or otherwise run by an interpreter or virtual machine (run by control circuitry 418). In some embodiments, applications may be encoded in the ETV Binary Interchange Format (EBIF), received by control circuitry 418 as part of a suitable feed, and interpreted by a user agent running on control circuitry 418. For example, an application may be an EBIF application. In some embodiments, applications may be defined by a series of JAVA-based files that are received and run by a local virtual machine or other suitable middleware executed by control circuitry 418.

System includes one or more user devices 102, such as a tablet computer, a smartphone, a smart television, or the like, configured to display media content to one or more respective users. System 100 may also include network 108 such as the Internet, configured to communicatively couple user devices 102 to one or more servers 104 and/or one or more content databases 106 from which media content, such as TV shows, movies and/or advertisement content, may be obtained for display on the user devices 102. User devices 102 and the one or more servers 104 may be communicatively coupled to one another by way of network 108, and the one or more servers 104 may be communicatively coupled to content database 106 by way of one or more communication paths, such as a proprietary communication path and/or network 108. In some examples, server 104 may be a server of a service provider who provides media content for display on user devices 102.

In some examples, system 100 may comprise an application that provides guidance through an interface, e.g., a graphical user interface, that allows users to efficiently navigate media content selections, navigate an interactive media content item, and easily identify media content that they may desire, such as content provided on a database on one or more live streams. Such guidance is referred to herein as an interactive content guidance application or, sometimes, a content guidance application, a media guidance application, or a guidance application.

With the ever-improving capabilities of the Internet, mobile computing, and high-speed wireless networks, users are accessing media on user equipment devices on which they traditionally did not. As referred to herein, the phrases "user equipment device," "user equipment," "user device," "computing device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smartphone, or any other television equipment, computing equipment, or wireless device, and/or combination of the same. In some examples, the user equipment device may have a front-facing screen and a rear-facing screen, multiple front screens, or multiple angled screens. In some examples, the user equipment device may have a front-facing camera and/or a rear-facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available through both a television and one or more of the other types of user equipment devices. The media guidance applications may be provided as online applications (i.e., provided on a website), or as stand-alone applications or clients on user equipment devices. Various devices and platforms that may implement media guidance applications are described in more detail below.

Figure 7:
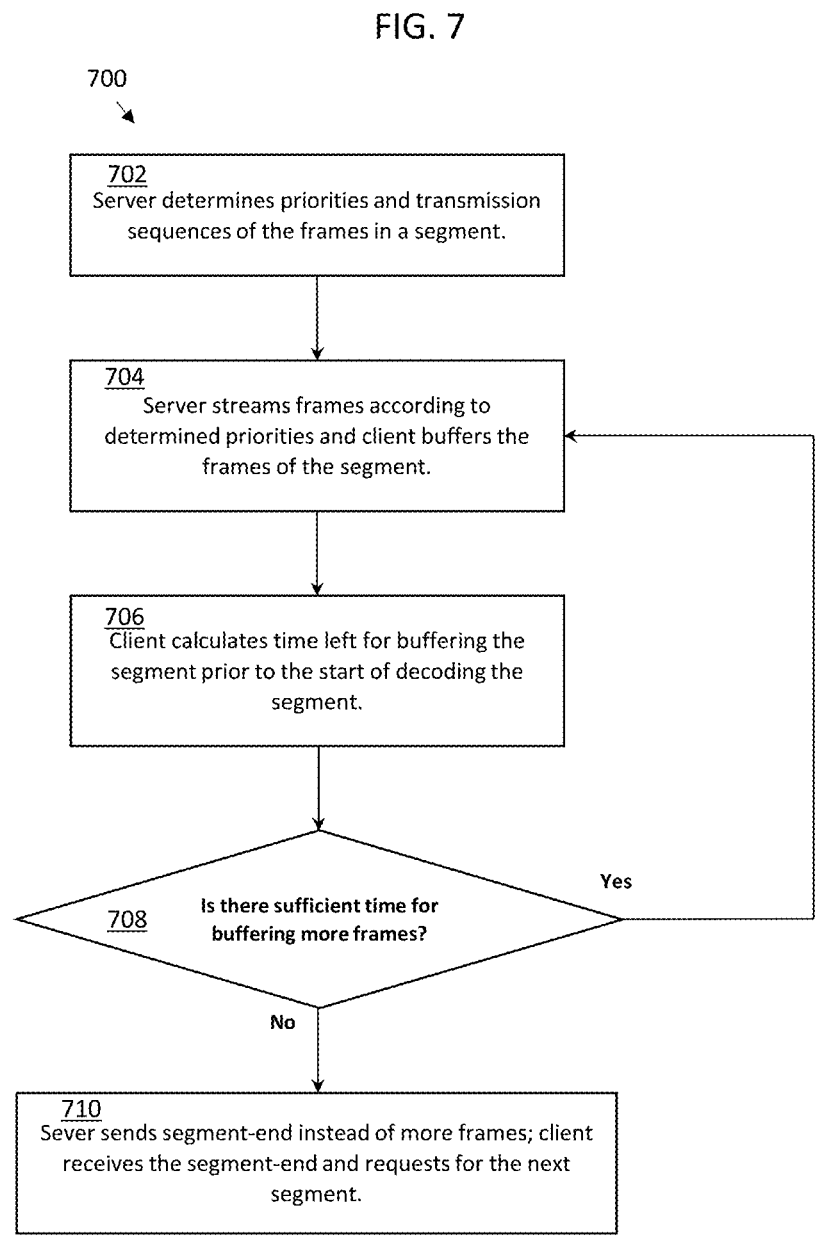

FIG. 7 is a flowchart representing an illustrative process 700 for streaming media content, in accordance with some examples of the disclosure. While the examples shown in FIG. 7 refer to the use of system shown in FIGS. 2 and 5, it will be appreciated that the illustrative process shown in FIG. 7, and discussed with respect to any of the other processes herein, may be implemented, either alone or in combination with any other appropriately configured system architecture. The methods or processes 700 may be implemented, in whole or in part, by the system(s) described herein and shown in the figures, including FIGS. 2 and 5. One or more actions of the depicted processes may be incorporated into or combined with one or more actions of any other process or embodiments described herein. The processes may be saved to a memory or storage (such as any one or more of those shown in FIGS. 2-5) as one or more instructions or routines that may be executed by a corresponding device or system to implement the process. Depending on the embodiment, one or more steps of the described process may be implemented or facilitated by a server.

As shown in FIG. 7, the server at 702 determines frame transmission priorities for a video segment. For example, a high priority frame set, as shown in FIG. 3C, may be selected from the frames of the segment. The high priority frame set may follow the encoding order shown in FIG. 3B, except with non-high priority frames removed. One or more additional frame sets with lower priorities (for example, a high priority frame set may include all I-frames, an intermediate priority frame set may include all P-frames, another frame set may comprise all the Bs-frames, another frame set may include all B-frames other than Bs-frames) may also be selected for each video segment, and these may be arranged in frame transmission sequences, as shown in FIGS. 3D, 3E and 3F.

In an embodiment, the frame sets and their priority levels may be selected by server 204 in real time without reliance on additional information from the content delivery network (CDN). For example, the server 204 may flag I-frames of a segment as high priority, or may flag I-frames and P-frames of a segment as high priority; may flag Bs-frames of a segment as intermediate priority; may flag other B-frames of a segment as lowest priority. Additional levels of frame priority may also be flagged, for example, to create five or more transmission sequences that could be sent by the server depending on time available, with the levels of priority depending on such factors as importance of the frame for other frames of the segment and data size of the frame (e.g. frames using less data may be preferable).

In an embodiment, the frame sets and their priority levels may be saved in advance in content database 206. For example, a content creator or a content supplier, such as a video streaming platform, may save frame sets of varying priorities (e.g., all Bs-frame may be one set), or may save frame transmission sequences (e.g. the frame transmission sequences shown in FIGS. 3C, 3D, 3E, and 3F, and FIGS. 4C, 4D, 4E and 4F) arranged according to the frame sets of varying priorities, for each segment of the video item. These frame sets and/or these frame transmission sequences may be stored ahead of transmission time in a content database 206.

In some examples, control circuitry may be configured to determine a current network bandwidth available for streaming a media content item. At the time of transmission, server 204 may then retrieve, according to how much time is left before play time, the priority transmission sequence from content database 206.

The amount of time remaining before play time may be contingent on available bandwidth given current transmission speeds, which may include such factors as the current ABR bitrate of the segment being transmitted, buffering, decoding speed of the computing device 202, the amount of data encoded in each frame, and other such factors. In addition, the amount of time remaining before playtime may depend on how far ahead the segment of the media content item currently being played is from the segment being (or about to be) transmitted. For example, if a video being played is 10 seconds ahead of the segment currently being transmitted, then under normal network conditions there may be ample time for transmitting the currently transmitted segment, including all the frames.

Instead of, or in addition to, communicating a time remaining, the computing device 202 may communicate to the server 204 a frame number (e.g. of a video segment earlier in the video content) being currently played by the computing device 202, or a frame number decoded and ready to be played, from which the server may estimate the time remaining until the present segment is needed. Or, the computing device 202 may communicate to the server 204 a time indicator at the portion of the video content being played. For example, the time indicator may indicate that the video content item is currently at 23 minutes 13 seconds into playing the video content item.

At 704, the server 204 may select one sequence of the frame sequences shown in FIG. 4C, 4D, 4E or 4F to be transmitted to client 202, depending on the time remaining before play of the segment by client. Client may buffer the frames of the segment. In an embodiment, the server 204 may start transmission of the high priority frame transmission sequence shown in FIG. 4C while the time remaining before play of the segment by client is being requested, and checked and returned by client. Then, based on the time remaining, the server may determine whether sufficient time remains for transmitting a lower priority frame sequence, and if so, determines whether sufficient time remains for transmitting lower priority frame sequence as shown in FIG. 4D, 4E or 4F.

At 706, the client may calculate how much time is left before its time to start playing the segment, taking into account such factors as time needed for buffering the frames received for the segment, for decoding them, and for performing other such processing. Also important may be how many segments to be played before this segment (the segment being transmitted) the computing device 202 has already saved in its buffer. For example, the computing device 202 may have already received and decoded several segments ready for play, in which case there may be plenty of time to download all the frames (in this example, this would include the frame transmission sequence shown at FIG. 3F). This time remaining may be communicated to the server.

At 708, is determined whether sufficient time remains for transmission and buffering of more frames of the segment. In an embodiment, this determination is performed by the server 204 based on the information received from the computing device 202. In an embodiment, this determination is made by the client computing device 202. For example, based on the time remaining before start of playback, the number of bits that could be transmitted in the interim may be computed.

The size of each frame of a frame transmission sequence, and/or the size of each frame transmission sequence as a whole, may be stored in advance. For example, such data may be stored together with the respective frame transmission sequence in content database 206. In the alternative, or in addition, a data structure (for example, stored in content database 206) may indicate for each video segment, the amount of data necessary for transmission of each frame transmission sequence, so as to facilitate the determination at runtime. The amount of data that may be transmitted per unit time at currently prevailing transmission ABR conditions may also be determined.

If there is additional time (yes at 708), processing may return to 704 and additional frames may be transmitted to computing device 202. For example, if after transmitting only the high priority frame set shown in FIG. 3C, it may be determined that sufficient time remains for transmitting a lower priority frame sequence, and if so, determines whether sufficient time remains for transmitting lower priority frame sequence as shown in FIG. 4D, 4E or 4F. If insufficient time remains, then at 710, the server may send a segment end indicating signal to indicate that the final frame of the frame transmission sequence has been sent. The client may then request the frames of the following segment. In an implementation, such a time remaining determination may be made after or in parallel with each frame sequence transmission to see whether any further frames could still be transmitted.

FIG. 8 is a flowchart representing an illustrative process 800 for streaming media content, in accordance with some examples of the disclosure, including those shown in FIGS. 1-5. While the examples shown in FIG. 7 refer explicitly to the use of system shown in FIGS. 2 and 5, it will be appreciated that the illustrative process shown in FIG. 7, and discussed with respect to any of the other processes herein, may be implemented, either alone or in combination with any other appropriately configured system architecture. The methods or processes 700 may be implemented, in whole or in part, by the system(s) described herein and shown in the figures, including FIGS. 2 and 5. One or more actions of the depicted processes may be incorporated into or combined with one or more actions of any other process or embodiments described herein. The processes may be saved to a memory or storage (such as any one or more of those shown in FIGS. 2 and 5) as one or more instructions or routines that may be executed by a corresponding device or system to implement the process. Depending on the embodiment, one or more steps of the described process may be implemented or facilitated by a server.

In an embodiment, FIG. 8 may provide an incremental frame sequence transmission approach, in which a first frame sequence is transmitted for a segment, and if time remains before play time, then a second frame sequence is transmitted for the segment, and if additional time remains before play time then a further frame sequence is transmitted thereafter.

As shown at 802 the server 204 determines frame transmission sequence priorities for a video segment that is to be transmitted to the client media player 202. For example, the server 204 may sort frame transmission sequences according to I-frames, P-frames, Bs-frames and standard B-frames.

At 804 server 204 may request the time remaining before play of the segment by the client media device 202.

At 806, the server 204 may receive the time remaining from the client media device 202. For example, the client media device may determine that the currently playing segment is three segments ahead of the segment that is being streamed or to be streamed. This information may be transmitted to the server. In addition, or instead, the client media device may indicate to the server 204 that sufficient time remains for receipt of all the frames of the segments to be transmitted.

At 808, the server 204 determines whether sufficient time remains for a lower priority frame transmission sequence to be transmitted. If sufficient time does not remain, then at 810 the server transmits the high priority frames, for example, the high priority frames shown in FIGS. 3C and 4C. In this case, processing continues to 812, where the server 204 may signal an end of segment to the client media device 202 and then processing returns to 802—the server processes the following video segment.

On the other hand, if sufficient time remains for a lower priority frame transmission sequence at 808, then 814 the server 204 transmits a lower priority frame sequence, for example, the frame sequence shown in FIG. 3D. Thus, based on how much time remains, it is determined whether sufficient time remains for transmitting lower priority frame sequence as shown in FIG. 3D, 3E or 3F.

At 816, the server 204 determines whether sufficient time remains for the next lower priority frame transmission sequence, for example, for the frame transmission sequence shown in FIG. 3E or FIG. 3F. The server 204 may request the time remaining data from the client media device 202 before each time the server 204 determines whether sufficient time remains for the next lower priority frame transmission sequence. Or, the client media device 202 may continually, or from time to time, update the server 204 regarding how much time remains before play of the currently streamed segment. In an implementation, the client media device 202 informs the server 204 before each video segment of the amount of time remaining.

If sufficient time does not remain, then at 818 the server may signal an end of segment to the client media device 202 and then processing returns to 802—the server processes the following video segment.

On the other hand, if sufficient time remains for a lower priority frame transmission sequence at 816, then at 820 the server 204 transmits the following lower priority frame sequence, for example, the frame sequence shown in FIG. 3E or 4E. At each time remaining determination, the amount of data in the following lower priority frame transmission sequence may be determined in advance. Thus, in order to determine whether sufficient time remains, the server may know how much data is to be transmitted as part of the next lower priority frame transmission sequence.

In an embodiment, an average lower priority frame transmission sequence data amount is used for all lower priority frame transmission sequence determinations, and thus the exact amount of data in the next lower priority frame transmission sequence is not determined. In an embodiment, the time remaining before play of the segment may be estimated based on previous frame transmissions. For example, given normal playback mode, and in view of current ABR transmission conditions, the server 204 may estimate how much time is likely to remain before play. Or, in view of the time remaining data received from the client media device 202 for previous segments, the server 204 may estimate the time remaining. If additional lower priority frame transmission sequences remain for the video segment, then the process may continue by additionally determining whether additional time remains for the next lower priority frame transmission sequence.

It will be appreciated that the exact steps, processes and structures, described in the description and figures herein are merely for the sake of example. Indeed, the manner in which the quality of the first or second portion may be reduced based on a quality reduction profile, which is described below in more detail. For the avoidance of doubt, any process or processes described in relation to 700 may be implemented in 800, and vice versa.

The actions or descriptions of FIGS. 7 and 8 may be used with any other example of this disclosure. In addition, the actions and descriptions described in relation to FIGS. 7 and 8 may be done in any suitable alternative orders or in parallel to further the purposes of this disclosure.

The term "and/or," may be understood to mean "either or both" of the elements thus indicated. Additional elements may optionally be present unless excluded by the context. Terms such as "first," "second," "third" in the claims referring to a structure, module or step should not necessarily be construed to mean precedence or temporal order but are generally intended to distinguish between claim elements.

The above-described embodiments are intended to be examples only. Components or processes described as separate may be combined or combined in ways other than as described, and components or processes described as being together or as integrated may be provided separately. Steps or processes described as being performed in a particular order may be re-ordered or recombined.

Features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time.

The systems and/or methods described above may be applied to, or used in accordance with, other systems and/or methods. In various embodiments, additional elements may be included, some elements may be removed, and/or elements may be arranged differently from what is shown. Alterations, modifications and variations can be affected to the particular embodiments by those of skill in the art without departing from the scope of the present application, which is defined solely by the claims appended hereto. The processes described above are intended to be illustrative and not limiting. The above-provided disclosure and the Drawings of the application are meant to be exemplary and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel.

What is claimed is:

1. A method comprising:

determining a first set of video data frames of a plurality of video data frames having a high priority, wherein the plurality of video data frames correspond to a video segment of a content item;

determining a second set of video data frames of the plurality of video data frames having a lower priority;

receiving an indication of a time remaining until play of the video segment of the content item;

determining, based at least in part on the indication of the time remaining until play of the video segment, whether sufficient time remains a) for reception of both the first set of video data frames and the second set of video data frames and b) for processing of the first set of video data frames and the second set of video data frames;

based at least in part on determining that sufficient time remains for reception of both the first set of video data frames and the second set of video data frames:

causing transmission of the first set of video data frames and the second set of video data frames, wherein the video segment is played at a first frame rate; and based at least in part on determining that sufficient time does not remain for reception of both the first set of video data frames and the second set of video data frames:

causing transmission of the first set of video data frames and not causing transmission of the second set of video data frames of the first video segment, wherein the first set of video data frames is played at a rate lower than the first frame rate.

2. The method of claim 1, further comprising:

determining a bitrate for transmission according to an adaptive bitrate (ABR) transmission protocol, wherein the causing the transmission of the first set of video data frames and the second set of video data frames is performed according to the determined bitrate and according to the indication of the time remaining until play of the video segment.

3. The method of claim 1, wherein the first set of video data frames comprises I-frames, and the second set of video data frames comprises B-frames.

4. The method of claim 3, wherein the first set of video data frames does not include B-frames.

5. The method of claim 1, further comprising:

determining a transmission sequence comprising video frames of the first set of video data frames, the second set of video data frames, and a third set of video data frames of the plurality of video data frames, wherein the third set of video data frames comprises B-frames and does not include I-frames; and based at least in part on determining, according to the indication of the time remaining until play of the video segment, that sufficient time remains for reception of the first set of video data frames, the second set of video data frames, and the third set of video data frames:

causing transmission, according to the transmission sequence, of the video frames of the first set of video data frames, the second set of video data frames, and the third set of video data frames, wherein the video segment is played at a higher frame rate than the first frame rate.

6. The method of claim 5, wherein the third set of video data frames does not include P-frames.

7. The method of claim 1, wherein the first set of video data frames and the second set of video data frames each comprise a plurality of video data blocks, wherein each of the plurality of video data blocks comprise a respective video frame, and wherein, when insufficient time remains for reception of both the first set of video data frames and the second set of video data frames, video frames are displayed according to a display order such that video frames of the first set of video data frames are repeated in place of video frames of the second set of video data frames.

8. The method of claim 1, further comprising:

based at least in part on the determining that sufficient time does not remain for reception of both the first set of video data frames and the second set of video data frames:

causing transmission of an indication of a segment-end for the video segment following the transmission of the first set of video data frames.

9. The method of claim 1, wherein the video segment is a first video segment, the method further comprising:

based at least in part on the determining that sufficient time does not remain for reception of both the first set of video data frames and the second set of video data frames:

causing transmission of a subsequent video data frame of a second video segment of the content item subsequent to the first video segment of the content item.

10. The method of claim 1, wherein the processing of the first set of video data frames and the second set of video data frames comprises at least one of: buffering of video data frames and decoding of the video data frames.

11. A method comprising:

determining a high priority transmission sequence of a first set of video data frames of a plurality of video data frames, wherein the plurality of video data frames correspond to a video segment of a content item;

determining a lower priority transmission sequence comprising a second set of video data frames of the plurality of video data frames;

causing transmission of the first set of video data frames and not causing transmission of the second set of video data frames of the video segment;

receiving an indication of time remaining until play of the video segment of the content item;

determining, based at least in part on the indication of the time remaining until play of the video segment, whether sufficient time remains a) for reception of the second set of video data frames and b) for processing of the first set of video data frames and the second set of video data frames; and based at least in part on determining that sufficient time remains until play of the second set of video data frames:

causing transmission of the second set of video data frames, wherein the video segment is played at a first frame rate; and based at least in part on determining that sufficient time does not remain until play of the second set of video data frames:

causing transmission of a signal indicating a segment end of the video segment, wherein the video segment is played at a second frame rate lower than the first frame rate.

12. The method of claim 11, further comprising:

receiving a further indication of time remaining until play of the video segment of the content item;

based at least in part on determining that sufficient time remains for reception of a further lower priority transmission sequence of the video segment:

causing transmission of the further lower priority transmission sequence, wherein the video segment is played at a frame rate higher than the first frame rate.

13. A system comprising:

processing circuitry configured:

to determine a first set of video data frames of a plurality of video data frames having a high priority, wherein the plurality of video data frames correspond to a video segment of a content item;

to determine a second set of video data frames of the plurality of video data frames having a lower priority;

to receive an indication of a time remaining until play of the video segment of the content item;

to determine, based at least in part on the indication of the time remaining until play of the video segment, whether sufficient time remains a) for reception of both the first set of video data frames and the second set of video data frames and b) for processing of the first set of video data frames and the second set of video data frames; and communication circuitry configured:

based at least in part on determining that sufficient time remains for reception of both the first set of video data frames and the second set of video data frames:

to cause transmission of the first set of video data frames and the second set of video data frames, wherein the video segment is played at a first frame rate; and based at least in part on determining that sufficient time does not remain for reception of both the first set of video data frames and the second set of video data frames:

to cause transmission of the first set of video data frames and not causing transmission of the second set of video data frames of the video segment, wherein the first set of video data frames is played at a rate lower than the first frame rate.

14. The system of claim 13, wherein the system is configured:

to determine a bitrate for transmission according to an adaptive bitrate (ABR) transmission protocol, wherein the causing the transmission of the first set of video data frames and the second set of video data frames is performed according to the determined bitrate and according to the indication of the time remaining until play of the video segment.

15. The system of claim 13, wherein the first set of video data frames comprises I-frames, and the second set of video data frames comprises B-frames.

16. The system of claim 15, wherein the first set of video data frames does not include B-frames.

17. The system of claim 13, wherein the system is configured:

to determine a transmission sequence comprising video frames of the first set of video data frames, the second set of video data frames, and a third set of video data frames of the plurality of video data frames, wherein the third set of video data frames comprises B-frames and does not include I-frames; and based at least in part on determining, according to the indication of the time remaining until play of the video segment, that sufficient time remains for reception of the first set of video data frames, the second set of video data frames, and the third set of video data frames:

to cause transmission, according to the transmission sequence, of the video frames of the first set of video data frames, the second set of video data frames and the third set of video data frames, wherein the video segment is played at a higher frame rate than the first frame rate.

18. The system of claim 13, wherein the first set of video data frames and the second set of video data frames each comprise a plurality of video data blocks, wherein each of the plurality of video data blocks comprise a respective video frame, and wherein, when insufficient time remains for reception of both the first set of video data frames and the second set of video data frames, video frames are displayed according to a display order such that video frames of the first set of video data frames are repeated in place of video frames of the second set of video data frames.

19. The system of claim 13, wherein the system is configured:

based at least in part on the determining that sufficient time does not remain for reception of both the first set of video data frames and the second set of video data frames:

to cause transmission of an indication of a segment-end for the video segment following the transmission of the first set of video data frames.

20. The system of claim 13, wherein the video segment is a first video segment, and wherein the system is configured:

based at least in part on the determining that sufficient time does not remain for reception of both the first set of video data frames and the second set of video data frames:

to cause transmission of a subsequent video data frame of a second video segment of the content item subsequent to the first video segment of the content item.

* * * * *